United States Patent [19]
King

[11] Patent Number: 5,913,963
[45] Date of Patent: Jun. 22, 1999

[54] SINGLE CUP BREWER HAVING SPECIAL BREW CHAMBER

[76] Inventor: Alan M. King, 4369 Montrose Ave., Westmount, Quebec, Canada, H37-2B2

[21] Appl. No.: 09/087,798

[22] Filed: Jun. 1, 1998

[51] Int. Cl.[6] ................................................... A47J 31/32
[52] U.S. Cl. ............................. 99/302 P; 99/285; 99/287
[58] Field of Search ................................. 99/287, 289 R, 99/297, 302 P, 285

[56] References Cited

U.S. PATENT DOCUMENTS

| | | |
|---|---|---|
| 3,122,988 | 3/1964 | Rota . |
| 3,209,676 | 10/1965 | Zimmerman et al. . |
| 3,552,976 | 1/1971 | King . |
| 3,565,641 | 2/1971 | King . |
| 3,715,974 | 2/1973 | Beverett .................................... 99/285 |
| 4,426,919 | 1/1984 | Rhoten . |
| 4,612,850 | 9/1986 | Kanazashi et al. .................... 99/289 R |
| 4,632,023 | 12/1986 | King ...................................... 99/302 P |
| 4,791,859 | 12/1988 | King . |
| 4,833,979 | 5/1989 | Garulli et al. ............................. 99/287 |
| 4,903,586 | 2/1990 | King .......................................... 99/287 |
| 4,967,647 | 11/1990 | King . |
| 4,974,751 | 12/1990 | King . |
| 5,259,298 | 11/1993 | King . |
| 5,297,472 | 3/1994 | Suzuki et al. . |
| 5,309,820 | 5/1994 | Baxter et al. . |
| 5,337,653 | 8/1994 | Sellers . |
| 5,349,897 | 9/1994 | King et al. . |
| 5,351,604 | 10/1994 | King et al. . |
| 5,406,882 | 4/1995 | Shaanan ..................................... 99/287 |
| 5,479,849 | 1/1996 | King et al. . |
| 5,515,772 | 5/1996 | DeGroen . |
| 5,642,655 | 7/1997 | King . |
| 5,697,288 | 12/1997 | King . |
| 5,813,317 | 9/1998 | Chang ...................................... 99/285 |

FOREIGN PATENT DOCUMENTS

| | | |
|---|---|---|
| 1011110 | 10/1958 | Norway . |
| 2 288 972 | 11/1995 | United Kingdom . |

*Primary Examiner*—Reginald L. Alexander

[57] ABSTRACT

A beverage brewing machine for producing a single serving has a lower brewer and an upper brew chamber housing. The lower brewer has a brewing cylinder defining therein a lower brewing chamber which has a reciprocal piston therein. The top of the brewing cylinder includes a liquid pervious support surface on which a beverage substance may rest. The upper brew chamber housing is received over the brewing cylinder above the liquid pervious support surface and defines an upper brewing chamber therein. The upper brew chamber housing includes an inlet which communicates with the upper brewing chamber. The upper brewing chamber receives liquid to be brewed from an external source one serving at a time.

20 Claims, 3 Drawing Sheets

SINGLE CUP BREWER HAVING SPECIAL BREW CHAMBER

BACKGROUND OF THE INVENTION

The present invention relates generally to a beverage brewing machine, and more particularly to a brewing machine which brews a beverage from ground coffee or any other beverage ingredient for a single cup quantity of the beverage.

It is known in the art to provide a brewing machine for beverages such as coffee which brew a quantity of a beverage in single cup sizes. These devices which are relatively simple in design still remain fairly complex in construction and are relatively expensive for the amount of coffee brewed. These devices typically include a mechanism as a part of the device which heats hot water and runs the hot water through ground coffee or other beverage material and through a filter.

A need exists for a single cup beverage brewing machine of relatively low cost and simple construction. One problem with existing devices is that they are relatively complex in construction in that they include the water heating components, water delivery components, coffee filtering components and cup holding components. Such devices take up quite a bit of counter space and are relatively expensive to manufacture and assemble when considering that they are utilized to brew only single cups of a beverage.

SUMMARY OF THE INVENTION

It is, therefore, an object of the present invention to solve these and other problems with the prior art brewing machines. It is another object of the present invention to produce a home brewing machine which has fewer components, is relatively low in manufacturing and assembly costs, and is smaller in size than conventional machines.

In an embodiment of the present invention, a beverage brewing machine has a brewing cylinder defining a lower brewing chamber. The brewing cylinder has an open upper end and a lower end. A piston is received within the lower brewing chamber and is movable between the upper and lower ends of the cylinder. A liquid pervious porous support surface is received over the open upper end of the brewing cylinder and is adapted to receive thereon a beverage material to be brewed. An upper brewed chamber housing is received over the porous support surface and defines an upper brew chamber having a single serving liquid volume. The upper brew chamber housing has a spout for receiving a liquid to be brewed.

In an embodiment, a link is connected to a bottom end of the piston for moving the piston within the brewing chamber. In another embodiment, a crank arm is connected to the link and is rotationally driven for moving the piston and the link.

In an embodiment, the upper brew chamber housing also has a cylinder with an upper end and an open lower end attached to the beverage brewer. An annular wall extends radially inward from the cylinder at the upper end which defines an inlet opening. The single serving brew chamber is then defined within the cylinder between the annular wall and the open lower end. A cylindrical neck section extends upward from the annular wall adjacent the inlet opening and the spout extends upward and radially outward from the cylindrical neck section for receiving the liquid to be brewed.

In an embodiment, a plurality of level indicators are located on the spout for measuring a volume of liquid held within the brewed chamber housing.

In an embodiment, the brew chamber housing is fabricated from a transparent material.

In an embodiment, the spout has a frusto-conical shape and has an open upper end of a first diameter and an open lower end of a second diameter which is smaller than the first diameter. The lower end is connected to the cylindrical neck section of the brew chamber housing.

In an embodiment, a main housing supports the brewing cylinder. The main housing has a means to selectively cycle the piston between the upper and lower ends of the brewing cylinder according to a predetermined brewing cycle. In anther embodiment, the means to is selectively cycle the piston is an electronic means which is activated by a button disposed on the main housing.

In an embodiment, the brewing cylinder is a circular cylinder.

In an embodiment, the upper brew chamber and the porous support surface are adapted for use with a single serving tea bag. In another embodiment, the upper brew chamber and porous support surface are adapted for use with a single serving coffee filter package.

In an embodiment, a porous cap is attached to the open upper end of the brewing cylinder which defines the porous support surface.

In an embodiment, a plurality of beverage discharge slots are formed in the brewing cylinder which permit liquid to discharge from the lower brewing cylinder when the piston is moved to a lower most position.

In an embodiment, a means is included on the beverage brewing machine to secure the upper brew chamber housing to the brewing cylinder during a brewing cycle.

In another embodiment of the present invention, a brew chamber housing for a beverage brewing machine has a cylinder having an upper end and an open lower end for attachment to the beverage brewer. An annular wall extends radially inward from the cylinder at the upper end which defines an inlet opening. A single serving brew chamber is defined within the cylinder between the annular wall and the lower end. A cylindrical neck section extends upward from the annular wall adjacent the inlet opening. A spout extends upward and radially outward from the cylindrical neck section for receiving a liquid.

In an embodiment, the brew chamber has a plurality of level indicators located on the spout for measuring a volume of liquid held within the brew chamber housing.

In an embodiment, the brew chamber housing is fabricated from a transparent material.

In an embodiment, the spout is a frusto-conical shaped spout having an open upper end of a first diameter and an open lower end of a second diameter which is smaller than the first diameter. The lower end is connected to the cylindrical neck section.

In an embodiment, the cylinder, annular wall and cylindrical neck section of the brew chamber housing are circular.

These and other objects, features and advantages of the present invention will be readily apparent from the following description of certain preferred embodiments thereof taken in conjunction with the accompanying drawings, although variations and modifications may be effected without departing from the spirit and scope of the novel concepts of the disclosure including the drawing figures.

DETAILED DESCRIPTION OF THE PRESENTLY PREFERRED EMBODIMENTS

Figure 1:
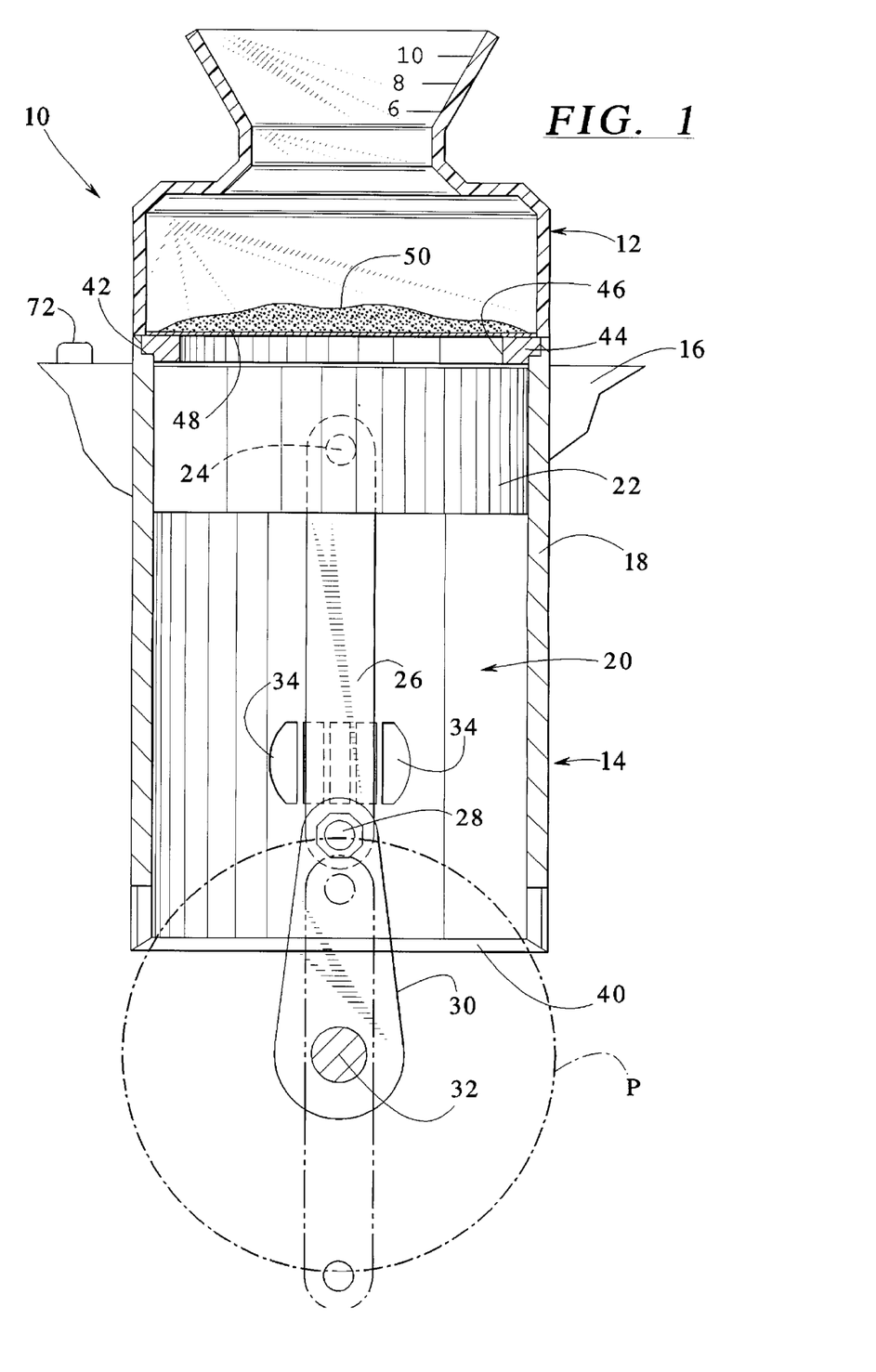
FIG. 1 illustrates a cross-sectional view of a single cup beverage brewing machine having a special brew chamber constructed in accordance with one embodiment of the present invention.

FIG. 1 illustrates a beverage brewing machine 10 having generally an upper brew chamber housing 12 and a lower beverage brewer 14. The machine 10 is adapted for brewing beverages such as coffee or tea and preferably beverages which are held in individual sized brewing filter packets.

The brewer 14 has a housing 16 which supports a main brewing cylinder 18. The brewing cylinder 18 may take on a variety of configurations and constructions, but in the present embodiment, the brewing cylinder 18 is a circular cylinder defining therein a lower brewing chamber 20. Received within the lower brewing chamber 20 is a piston 22 which is movable within the cylinder 18 from a completely raised position as shown in the view in FIG. 1 to a completely lowered position as shown in the view in FIG. 3.

Figure 3:
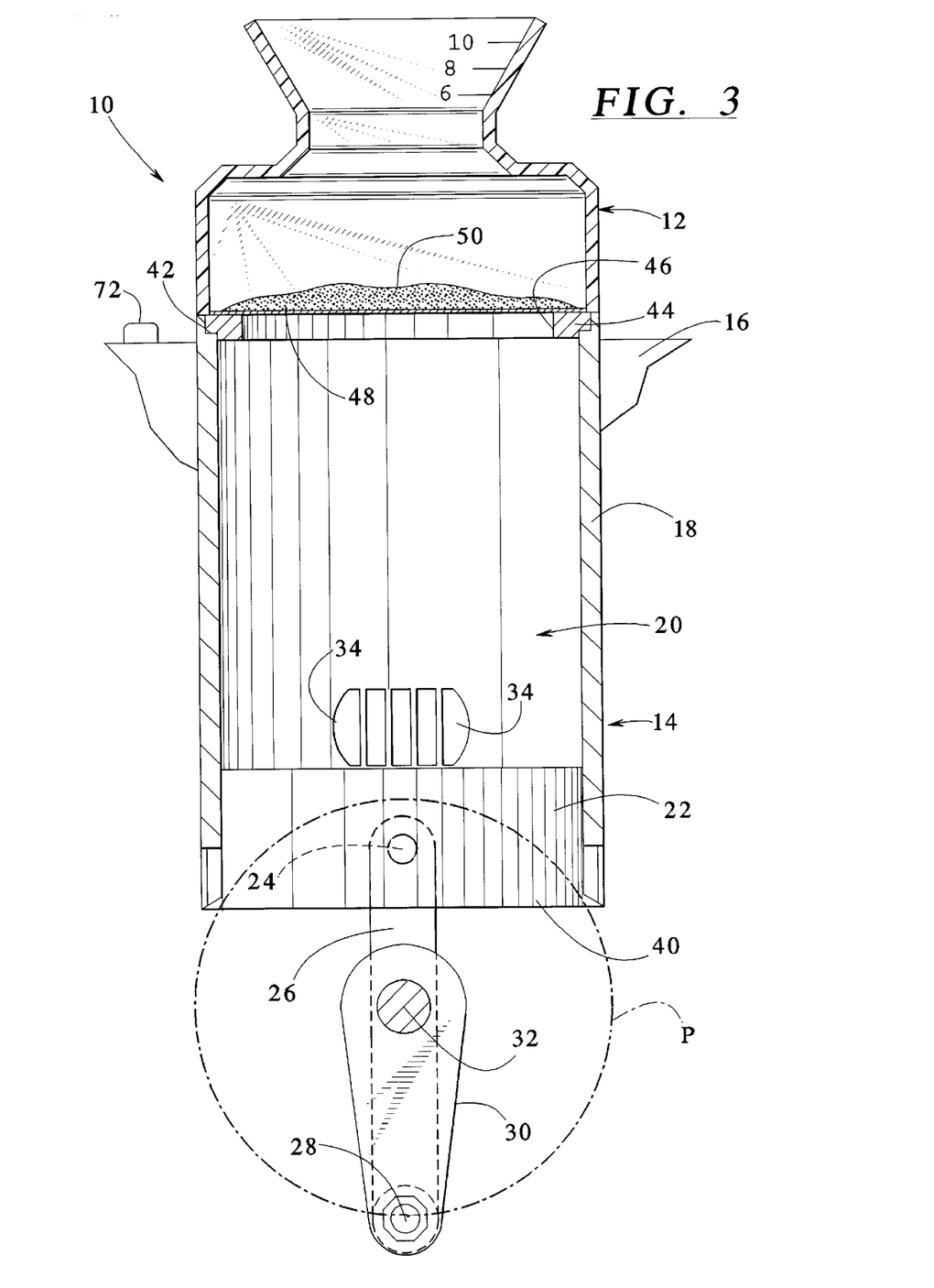
FIG. 3 illustrates a cross-sectional view of the single cup beverage brewing machine of FIG. 1 wherein the piston is in a lower most position.

The piston 22 is connected by a wrist pin or pivot 24 to a reciprocating link 26. The link 26 is connected at its opposite end to another wrist pin or pivot 28 to a crank arm 30. The crank arm 30 is driven by a shaft 32 connected to a suitable driving element such as an electric motor (not shown). The main cylinder 18 also includes a plurality of beverage discharge slots 34 formed therein just above a top surface 36 of the piston 22 when in its most lower position as illustrated in FIG. 3. The discharge slots 34 permit coffee to exit the lower brewing chamber 20 onto a spout (not shown) which is attached to the exterior of the brewing cylinder 18 for directing the brewed beverage into a cup (not shown) placed below the spout.

The brewer 14 and the housing 16 may include appropriate electronics for running the brewing cycle as will be described in more detail below. The electronics are not shown in detail in the present embodiment but are schematically illustrated in FIGS. 1 and 3 as electronic controls 38. Additionally, the housing 16 for supporting the brewing cylinder 18 and the appropriate electronics 38 may take on any number of configurations and constructions as well without departing from the scope of the present invention. It is intended, however, that the overall size of the housing be relatively small and include only those components necessary for running the brewing cycle described below. The housing 16 does not include any water heating elements, water reservoirs, or water inlet attachments as known in prior machines.

The brewing cylinder 18 includes an opened lower end 40 for permitting the mechanical components such as the link 26 and the crank arm 30 to operate beneath the piston 22. The brewing cylinder 18 also includes an open upper end 42 including therein a screened or porous cap 44 received therein. The porous cap 44 includes a large opening 46 communicating with the lower brewing chamber 20 above the top surface 36 of the piston 22. The porous cap 44 also includes a porous support surface 48 which may be in the form of a screen, a large opening wire mesh or other such large porous configuration which is capable of supporting a beverage filter packet thereon but also capable of freely permitting fluid to flow therethrough into the lower brewing chamber 20.

As illustrated in FIGS. 1 and 3, a packet or bag 50 in the form of a filter bag as is known in the art is supported on the porous support surface 48 and includes therein dry ground coffee beans, tea leaves or other such dry beverage material.

Figure 2:
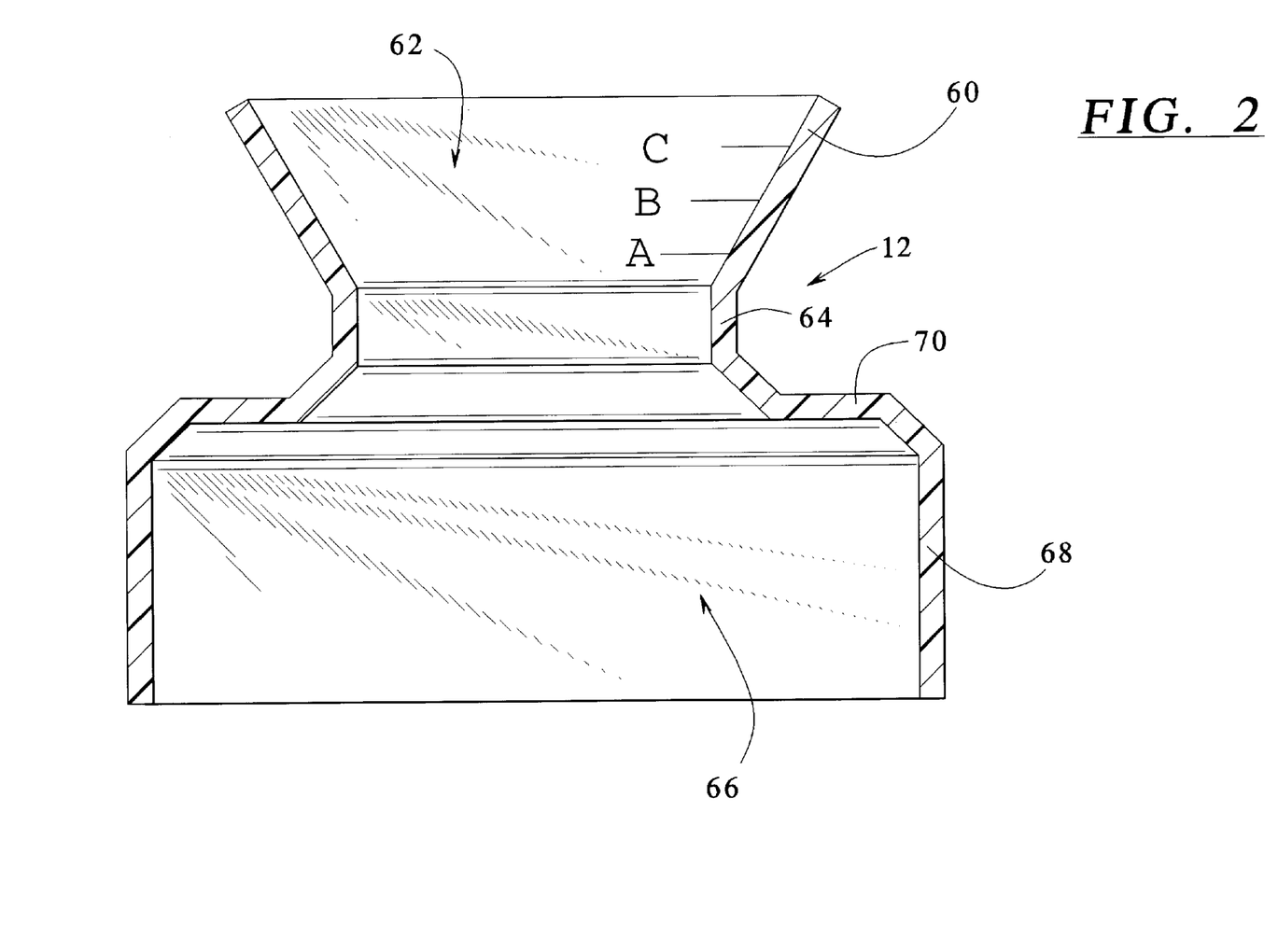
FIG. 2 illustrates a cross-sectional view of a brew chamber housing of the single cup beverage brewing machine of FIG. 1 inside elevational view.

The upper brew chamber housing 12 is received over the open upper end of the brewing cylinder 18 and the porous cap 44. As illustrated in FIG. 2, the upper brew chamber housing 12 includes an upper frusto-conical spout section 60 with an upper opening or inlet 62. The spout section 60 extends downward and adjoins a neck section 64 of a smaller diameter than the upper opening 62. The neck portion 64 opens into a large diameter upper brew chamber 66 defined by an outer cylindrical wall 68 which depends downwardly from an annular shoulder 70 extending from the neck portion 64.

Preferably, the upper brew chamber housing 12 is made from a clear plastic material so that an individual may view the contents within the chamber 66. The spout section 60 or the brew chamber housing 12 may also include several indicators, markings or level lines A, B and C as illustrated in FIG. 1 which represent specific volumes of fluid to be added to the upper brew chamber housing 12 in order to produce a specific amount of beverage. For example, the level line A may represent a six ounce volume of fluid poured into the housing 12, the level line B may represent an eight ounce volume of fluid and the level line C may represent a ten ounce volume of fluid. The frusto-conical section 60 assists an individual in pouring hot liquid into the upper brew chamber housing 12.

The brewing machine 10 of the present invention is intended to receive a liquid such as hot water which has been heated by a separate device. For example, an individual may pre-heat water using an electric kettle or a teapot on a stove and then pour the hot water through the inlet 62 of the spout section 60 into the upper brewing chamber 66.

To utilize the brewing machine 10 of the present invention an individual places the filter bag or packet 50 onto the porous support surface 48 and then places the upper brew chamber housing 12 onto the upper end of the brewing cylinder 18. A user then begins the brewing cycle by pressing, for example, a start button 72 located on the main housing 16 to begin operation of an electronic cycle controlled by the electronic controls 38 of the machine. As an example, the first actuation of the button 72 may initiate locking the upper brew chamber housing 12 onto the upper end of the brewing cylinder 18. Alternatively, the operator may need to manually secure the housing 12 in place onto the cylinder 18. Any number of means may be used to temporarily secure the housing 12 to the cylinder 18 such as electronically controlled clamps extending from the housing 16 which engage a shoulder on the upper housing 12. Alternatively, mating threads carried on both the cylinder and the upper housing 12 may be used to threadingly secure the two components to one another. Other constructions may be utilized as well without departing from the scope of the present invention. The connecting means is not shown in detail but is generally illustrated in FIGS. 1 and 3 as connecting means 52. It is, however, intended that the upper brew chamber housing 12 be secured to the brewing cylinder 18 during the brewing cycle. This is desirable because typically the liquid is hot water and is held within the upper brewing chamber 66. If the brew chamber housing 12 were to come loose, the fluid would escape and potentially cause burns or other traumatic injury to the individual or harm objects placed under or near the brewing machine 10.

Once the upper brew chamber housing 12 is secured to the cylinder 18, the beverage liquid such as hot water is poured into the inlet 60 of the spout section 60 to the desired level indicated by the level lines A, B or C. The hot liquid then interacts with the filter bag 50 and hence the dry ingredients held therein for brewing the desired beverage. Again, the operator may, for example, press the button 72 to begin the second stage of the brewing cycle. After an elapsed period of time, if necessary, and proceeding through a particular cycle time, the piston 22 is drawn downward from the completely raised position within the lower brewing chamber 20 by rotational movement of the crank arm 30 which draws the link 26 downward. This may be accomplished by means of the electronic controls 38 which drive the crank arm 30 and draws the line 26 downward. The negative pressure or vacuum created by movement of the piston 22 draws the fluid from the upper brewing chamber 66 through the filter bag 50 into the lower brewing chamber 20 above the top surface 36 of the piston 22. When the piston 22 reaches the completely lowered position as shown in FIG. 3, the discharge slots 34 are exposed permitting a brewed beverage to exit the lower brewing chamber 20 into a cup. The remaining brewing cycle simply moves the piston 22 upward to its highest position within the lower brewing chamber 20 adjacent the porous cap 44.

The present invention provides a novel single serving beverage brewer of compact size and simple construction for accurate measurement, brewing and dispensing of a desired brewed beverage. The upper brew chamber housing 12 permits easy access to the upper brewing chamber 66 in an accurate amount or volume and permits visual monitoring of the brewing process.

Although the present invention has been described with respect to preferred embodiments, it is not to be so limited as changes and modifications can be made which are within the full intended scope of the invention as defined by the appended claims.

I claim:

1. A beverage brewing machine comprising:
   a brewing cylinder defining a lower brewing chamber, the brewing cylinder having an open upper end and a lower end;
   a piston received within the lower brewing chamber, the piston moveable between the upper and lower ends of the brewing cylinder;
   a liquid pervious support surface received over the open upper end of the brewing cylinder receiving thereon a beverage substance to be brewed;
   an upper brew chamber received over the liquid pervious support surface defining an upper brew chamber having a single serving liquid volume; and
   a spout having an open upper end of a first diameter defining an inlet for receiving a liquid to be brewed and an open lower end of a second diameter smaller than the first diameter, the lower end connected to the upper brew chamber.

2. The beverage brewing machine according to claim 1 further comprising:
   a link connected to a bottom end of the piston moving the piston within the brewing chamber.

3. The beverage brewing machine according to claim 1 further comprising:
   a link connected to a bottom end of the piston; and
   a crank arm connected to the link, the crank arm rotationally driven to move the piston within the brewing chamber.

4. The beverage brewing machine according to claim 1 further comprising:
   a cylinder having an upper end and an open lower end attached to the open upper end of the brewing cylinder;
   an annular wall extending radially inward from the cylinder at the upper end defining an inlet opening, the single serving brew chamber defined within the cylinder between the annular wall and the open lower end;
   a cylindrical neck section extending upward from the annular wall adjacent the inlet opening; and
   a spout extending upward and radially outward from the cylindrical neck section and defining the inlet.

5. The beverage brewing machine according to claim 1 further comprising:
   a plurality of level indicators located on the brew chamber housing to measure a volume of liquid held within the upper brew chamber.

6. The beverage brewing machine according to claim 1 wherein the brew chamber housing is fabricated from a transparent material.

7. The beverage brewing machine according to claim 1 further comprising:
   a housing supporting the brewing cylinder, the housing including means to selectively cycle the piston between the upper and lower ends of the brewing cylinder according to a predetermined brewing cycle.

8. The beverage brewing machine according to claim 1 further comprising:
   a housing supporting the brewing cylinder;
   electronic means to selectively cycle the piston between the upper and lower ends of the brewing cylinder according to a predetermined brewing cycle; and
   a button on the housing to activate the electronic means.

9. The beverage brewing machine according to claim 1 wherein the brewing cylinder is a circular cylinder.

10. The beverage brewing machine according to claim 1 wherein the upper brew chamber and liquid pervious support surface are adapted for use with a single serving tea bag.

11. The beverage brewing machine according to claim 1 wherein the upper brew chamber and liquid pervious support surface are adapted for use with a single serving coffee filter package.

12. The beverage brewing machine according to claim 1 further comprising:
    a porous cap attached to the open upper end of the brewing cylinder and defining the liquid pervious support surface.

13. The beverage brewing machine according to claim 1 further comprising:
    a plurality of beverage discharge slots formed in the brewing cylinder permitting liquid to discharge from the lower brewing chamber when the piston is moved to a completely lowered position.

14. The beverage brewing machine according to claim 1 further comprising:
    means to secure the upper brew chamber housing to the brewing cylinder during a brewing cycle.

15. A brew chamber housing for a beverage brewing machine, the brew chamber housing comprising:
    a cylinder having an upper end and an open lower end attachable to a beverage brewer;
    an annular wall extending radially inward from the cylinder at the upper end defining an inlet opening;
    a single serving brew chamber defined within the cylinder between the annular wall and the open lower end;
    a cylindrical neck section extending upward from the annular wall adjacent the inlet opening; and a spout extending upward and radially outward from the cylindrical neck section receiving a liquid.

16. The brew chamber housing according to claim 15 further comprising:

a plurality of level indicators located on the spout to measure a volume of liquid held within the brew chamber housing.

17. The brew chamber housing according to claim 15, wherein the brew chamber housing is fabricated from a transparent material.

18. The brew chamber housing according to claim 15 wherein the spout is a frusto-conical shaped spout having an open upper end of a first diameter and an open lower end of a second diameter smaller than the first diameter, the lower end connected to the cylindrical neck section.

19. The brew chamber housing according to claim 15 wherein the cylinder, annular wall, and cylindrical neck section are circular.

20. A beverage brewing machine comprising:

a brewing cylinder defining a lower brewing chamber, the brewing cylinder having an open upper end and a lower end;

a piston received within the lower brewing chamber, the piston moveable between the upper and lower ends of the brewing cylinder;

a liquid pervious support surface received over the open upper end of the brewing cylinder receiving thereon a beverage substance to be brewed;

an upper brew chamber received over the liquid pervious support surface defining an upper brew chamber having a single serving liquid volume, the upper brew chamber having an inlet for receiving a liquid to be brewed;

a cylinder having an upper end and an open lower end attached to the open upper end of the brewing cylinder;

an annular wall extending radially inward from the cylinder at the upper end defining an inlet opening, the single serving brew chamber defined within the cylinder between the annular wall and the open lower end;

a cylindrical neck section extending upward from the annular wall adjacent the inlet opening; and a spout extending upward and radially outward from the cylindrical neck section and defining the inlet.

* * * * *

UNITED STATES PATENT AND TRADEMARK OFFICE
CERTIFICATE OF CORRECTION

PATENT NO. : 5,913,963
DATED : June 22, 1999
INVENTOR(S) : Alan M. King

Page 1 of 4

It is certified that error appears in the above-identified patent and that said Letters Patent is hereby corrected as shown below:

In Column 2, line 12, delete "is".

The title page, showing the illustrative figure should be deleted and substitute the attached page.

In the Drawings: In FIGS. 1 & 3, in the spout section, replace numerals "10,8,6" with the letters "C,B,A", respectively.

In FIGS. 1&3, a dashed line should extend vertically from "72" to the lower left corner and then horizontally to "30". The dashed line should meet at a box labeled "ELECTRONIC CONTROLS" which should be numbered "38"

Signed and Sealed this

Seventh Day of March, 2000

Attest:

Q. TODD DICKINSON

Attesting Officer

Commissioner of Patents and Trademarks

United States Patent [19]
King

[11] Patent Number: 5,913,963
[45] Date of Patent: Jun. 22, 1999

[54] SINGLE CUP BREWER HAVING SPECIAL BREW CHAMBER

[76] Inventor: Alan M. King, 4369 Montrose Ave., Westmount, Quebec, Canada, H37-2B2

[21] Appl. No.: 09/087,798

[22] Filed: Jun. 1, 1998

[51] Int. Cl.⁶ .................................................. A47J 31/32
[52] U.S. Cl. .............................. 99/302 P; 99/285; 99/287
[58] Field of Search ............................. 99/287, 289 R, 99/297, 302 P, 285

[56] References Cited

U.S. PATENT DOCUMENTS

| | | |
|---|---|---|
| 3,122,988 | 3/1964 | Rota . |
| 3,209,676 | 10/1965 | Zimmerman et al. . |
| 3,552,976 | 1/1971 | King . |
| 3,565,641 | 2/1971 | King . |
| 3,715,974 | 2/1973 | Beverett ............................ 99/285 |
| 4,426,919 | 1/1984 | Rhoten . |
| 4,612,850 | 9/1986 | Kanazashi et al. ............... 99/289 R |
| 4,632,023 | 12/1986 | King ................................. 99/302 P |
| 4,791,859 | 12/1988 | King . |
| 4,833,979 | 5/1989 | Garulli et al. ..................... 99/287 |
| 4,903,586 | 2/1990 | King ................................. 99/287 |
| 4,967,647 | 11/1990 | King . |
| 4,974,751 | 12/1990 | King . |
| 5,259,298 | 11/1993 | King . |
| 5,297,472 | 3/1994 | Suzuki et al. . |
| 5,309,820 | 5/1994 | Baxter et al. . |
| 5,337,653 | 8/1994 | Sellers . |
| 5,349,897 | 9/1994 | King et al. . |
| 5,351,604 | 10/1994 | King et al. . |
| 5,406,882 | 4/1995 | Shaanan .......................... 99/287 |
| 5,479,849 | 1/1996 | King et al. . |
| 5,515,772 | 5/1996 | DeGroen . |
| 5,642,655 | 7/1997 | King . |
| 5,697,288 | 12/1997 | King . |
| 5,813,317 | 9/1998 | Chang ............................. 99/285 |

FOREIGN PATENT DOCUMENTS

| | | |
|---|---|---|
| 1011110 | 10/1958 | Norway . |
| 2 288 972 | 11/1995 | United Kingdom . |

*Primary Examiner*—Reginald L. Alexander

[57] ABSTRACT

A beverage brewing machine for producing a single serving has a lower brewer and an upper brew chamber housing. The lower brewer has a brewing cylinder defining therein a lower brewing chamber which has a reciprocal piston therein. The top of the brewing cylinder includes a liquid pervious support surface on which a beverage substance may rest. The upper brew chamber housing is received over the brewing cylinder above the liquid pervious support surface and defines an upper brewing chamber therein. The upper brew chamber housing includes an inlet which communicates with the upper brewing chamber. The upper brewing chamber receives liquid to be brewed from an external source one serving at a time.

20 Claims, 3 Drawing Sheets

FIG. 1

FIG. 3